US008850919B2

(12) United States Patent
Weiss

(10) Patent No.: US 8,850,919 B2
(45) Date of Patent: Oct. 7, 2014

(54) ROTATABLE GRIP ACTUATOR

(75) Inventor: Martin Weiss, Schweinfurt (DE)

(73) Assignee: SRAM Deutschland GmbH (DE)

( * ) Notice: Subject to any disclaimer, the term of this patent is extended or adjusted under 35 U.S.C. 154(b) by 116 days.

(21) Appl. No.: 13/448,504

(22) Filed: Apr. 17, 2012

(65) Prior Publication Data

US 2013/0098188 A1     Apr. 25, 2013

(30) Foreign Application Priority Data

Apr. 19, 2011   (DE) .......................... 10 2011 018 163

(51) Int. Cl.
| | | |
|---|---|---|
| F16C 1/10 | (2006.01) | |
| B62K 23/04 | (2006.01) | |
| B62K 21/12 | (2006.01) | |
| B62K 21/26 | (2006.01) | |

(52) U.S. Cl.
CPC ............... B62K 23/04 (2013.01); B62K 21/125 (2013.01); B62K 21/26 (2013.01)
USPC ....................................................... 74/502.2

(58) Field of Classification Search
USPC ........ 74/500.5, 502.2, 501.6, 473.14, 473.15, 74/551.9
See application file for complete search history.

(56) References Cited

U.S. PATENT DOCUMENTS

| | | |
|---|---|---|
| 5,102,372 A | 4/1992 | Patterson |
| 5,197,927 A | 3/1993 | Patterson |
| 5,315,891 A | 5/1994 | Koichi |
| 5,802,927 A | 9/1998 | Yu |
| 5,862,709 A * | 1/1999 | Kageyama ...................... 74/489 |
| 6,389,929 B1 * | 5/2002 | Calilung et al. ............. 74/551.9 |
| 6,513,405 B1 * | 2/2003 | Sturmer et al. .............. 74/501.6 |
| 6,615,688 B2 * | 9/2003 | Wessel ......................... 74/551.9 |

FOREIGN PATENT DOCUMENTS

| | | |
|---|---|---|
| CN | 201040572 | 3/2008 |
| CN | 201046748 | 4/2008 |
| DE | 805 242 | 5/1951 |
| DE | 199 04 955 | 8/2000 |
| DE | 100 25 887 | 11/2001 |
| DE | 20 2008 011 887 | 12/2008 |
| EP | 0700827 | 3/1996 |
| EP | 1157919 | 4/2001 |
| JP | 10297571 | 11/1998 |
| JP | 2001213378 | 8/2001 |

* cited by examiner

*Primary Examiner* — Vicky Johnson
(74) *Attorney, Agent, or Firm* — Milan Milosevic; Lisa Serdynski; Steven Courtright

(57) ABSTRACT

The invention relates to a bicycle twist-grip shifter, which is connectable to a fixed handgrip and is mountable as a structural unit on a handlebar. In this way the fixed handgrip is securely fixed on the handlebar. Moreover, the individual components have an advantageous size for production in an injection molding process. The twist-grip shifter gives the operator a precise operation by avoiding disruptive frictional effects of the rotatable handgrip part on the mounting tube, for which purpose ball bearings are used for bearing the take-up spool, and a metallic positioning ring is used in the positioning mechanism.

11 Claims, 5 Drawing Sheets

ROTATABLE GRIP ACTUATOR

BACKGROUND OF THE INVENTION

The present invention relates to a rotatable grip actuator, or as more commonly known, a twist-grip shifter for shifting of bicycle gear units, such as multi-speed hubs or derailleurs.

EP 0 700 827 discloses a twist-grip shifter for controlling bicycle gear units. This twist-grip shifter includes a shifter housing with a shift mechanism, a clamping device for fixing the shifter on the handlebar, a rotatable take-up spool, a mounting tube on which a twist-grip part is rotatably mounted, and a grip end piece seated non-rotatably on the handlebar. The separate grip end piece is generally an elastomeric tube which is frictionally mounted on the handlebar and primarily transmits the manual supporting forces to the handlebar and, unlike twist-grip shifters without an additional fixed handgrip part, prevents unintentional shifting operations. In order to reduce friction, a plastic intermediate ring can be disposed between the twist-grip part and the fixed elastomeric tube.

In a further development of the twist-grip shifter, EP 1 157 919 discloses a fixed handgrip part or grip end piece of a twist-grip shifter which is formed integrally with the mounting tube. When the mounting tube and shift housing are fixed on the handlebar by means of a screw in a clamping clip, the grip end piece is fixed relative to the handlebar. In this way, unwanted shifting of the grip end piece or even possible slipping off the handlebar is avoided and safety during use is increased. The fixed handgrip part integrally connected to the shifter housing has a corresponding length in the axial direction. This places corresponding demands on the size of injection moulding machines used for the production of the shifter, which is a disadvantage.

BRIEF SUMMARY OF THE INVENTION

An object of the present invention, therefore, is to design a mounting tube and fixed handgrip assembly of a twist-grip shifter capable of being fitted and removed so that on the one hand they are connected to one another securely when fitted on the handlebar but also are nevertheless produced and handled individually. In one solution according to the invention, it is proposed to dispose resilient elastic tongues on the mounting tube, the tongues being equipped at the end with a catch profile or catch in order to form a positively engaged connection, which is fixed against torsion or displacement, to a matching profile on the shift housing. A screw on the clamping clip is tightened to ensure a reliable seating of the twist-grip shifter including the fixed handgrip on the handlebar. In this case, unlike previous twist-grip shift actuators, the additional working step of pushing on the separate fixed handgrip is omitted when fitting the twist-grip shift actuator. This design includes the possibility of providing and using a twist-grip shifter both in a variant with and a variant without a separate fixed handgrip part.

The twist-grip should freely rotate about the mounting tube. This is assisted by a closed mounting base on a ring which is disposed on the end of the mounting tube and which can be produced simply and with sufficient precision as a rotationally symmetrical part. There are no edges on the body over which the twist-grip would have to slide when the twist-grip shifter is actuated.

Moreover, the arrangement of ball bearings between the mounting tube and the twist-grip in the axial region, where the spool for winding of the cable to be actuated is located, is a measure for minimising friction.

A further object is that the parts belonging to the device according to the invention can be produced simply and cost-effectively.

One aspect of the invention provides a twist-grip shifter for actuation of bicycle gear units by pulling and releasing a cable, including a shifter housing configured to be received on a handlebar. A central mounting tube is disposed inwardly of the shifter housing. The central mounting tube includes a proximal end and a distal end, wherein the proximal end of the central mounting tube is fixedly connected to the shifter housing. A rotatable handgrip is rotatably disposed about the central mounting tube and adjacent the shifter housing. A take-up spool is rotatable with the rotatable handgrip for pulling and releasing the cable. A fixed handgrip includes a fixed grip tube configured to be non-rotatably received on the handlebar, and a connector releasably connecting the distal end of the central mounting tube to the fixed grip tube.

Other aspects of the invention provide a twist-grip shifter wherein the connector may include a first catch on the distal end of the central mounting tube, a second catch on the fixed grip tube, and a catch ring releasably connecting the first and second catch. The catch ring may be formed one-piece with one of the central mounting tube and the fixed grip tube. The central mounting tube and fixed grip tube may be disposed about and directly adjoining the handlebar. The catch ring may include on an inner periphery thereof a circumferential catch protrusion which projects radially inwardly, the catch protrusion releasably connecting the first and second catches. The central mounting tube and the fixed grip tube may be connected when the first and second catches are bent radially inwardly and pushed axially over the catch protrusion. The connector may include a first catch on the distal end of the central mounting tube and a second catch recess on the fixed grip tube, the second catch recess receiving the first catch. The connector may include a second catch on the fixed grip tube and a first catch recess on the distal end of the central mounting tube, the first catch recess receiving the second catch. The twist-grip shifter may further include a bearing disposed between the central mounting tube and the take-up spool. The shifter housing may include a metallic positioning ring and a positioning spring resiliently engaging the positioning ring.

An embodiment of a rotatable grip actuator according to the invention will be described in the following with the use of figures.

DETAILED DESCRIPTION OF THE INVENTION

Figure 1:
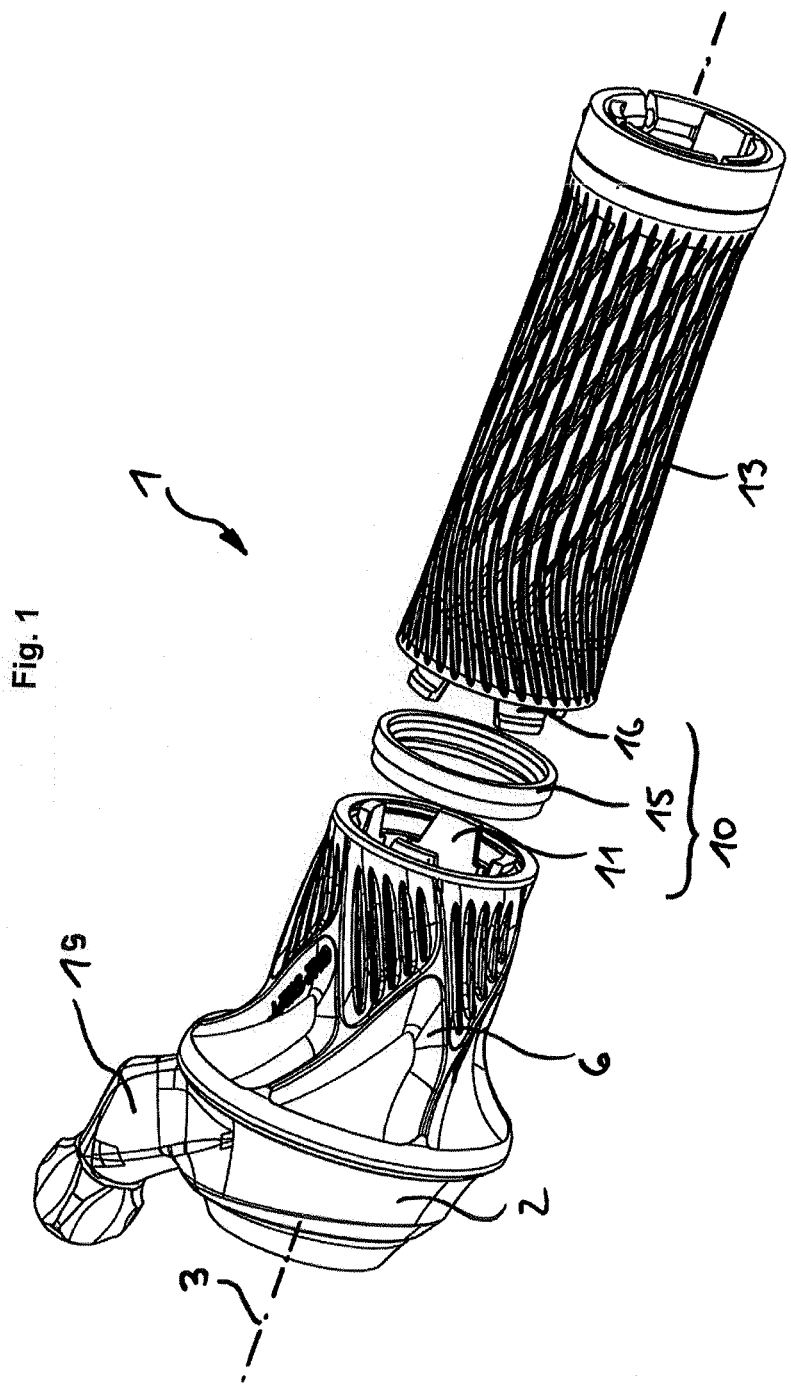
FIG. 1 is a perspective view of one embodiment of the invention, wherein the mounting tube and the fixed handgrip are removed.

FIG. 1 is a twist-grip shifter 1 according to an embodiment of the invention for actuation of a cable 5 (see FIG. 5) for shifting between individual gears in a gear shift device on a bicycle. The twist-grip shifter 1 is provided with a connector 10 between a shifter component with a shifter housing 2 and a rotatable handgrip 6 on the one hand and a fixed handgrip 13 on the other hand. The rotatable handgrip part 6 is disposed so as to be rotatable relative to a central or shifter mounting tube 7 (see FIG. 2). The twist-grip shifter 1 is usually fitted on a handlebar, as is well known, which handlebar exteriorly receives the central mounting tube 7.

Figure 4:
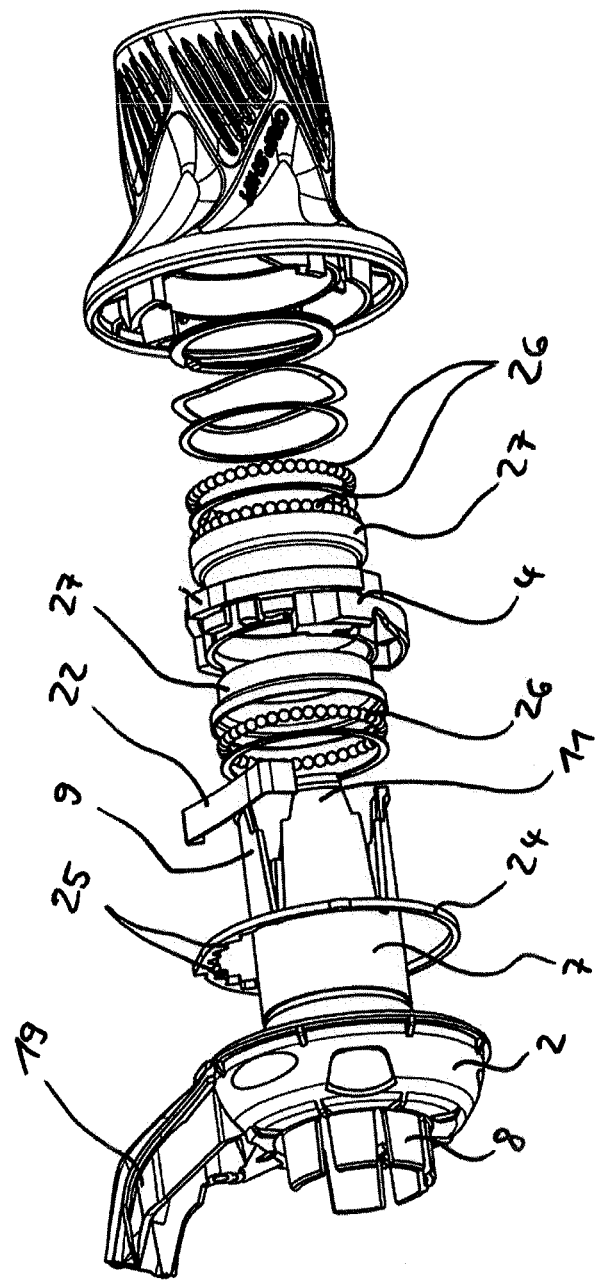
FIG. 4 is an exploded view of the shifter housing with the rotatable handgrip part and the positioning mechanism of the twist-grip shifter of FIG. 1.

A twist-grip shifter 1 according to the invention can be seen in FIGS. 1 and 4. The shifter housing 2 accommodates the mechanism for pulling and releasing a cable 5, which is wound or unwound from a take-up spool 4. In order that after completion of pulling or releasing operations the cable 5 remains positioned in one of the positions which correspond to the individual gears, a corresponding positioning device is provided, which will be described in detail below. The cable 5 is located on the take-up spool 4 primarily in a plane perpendicular a central axis 3 of the shifter 1, an axis shared by the handlebar when the shifter is mounted thereon. The outgoing cable 5 is guided in a cable guide 19 in the direction corresponding to its further path on the bicycle frame as far as the gear shift component to be shifted. The central mounting tube 7 and the shifter housing 2 form the mounting base for the movable elements of the cable actuation mechanism and for the rotatable handgrip part 6 on which the shifter is actuated by the cyclist. In the illustrated embodiment, the shifter housing 2 and the central mounting tube 7 are connected to one another in one piece and formed integrally on the proximal end 8 of the mounting tube, so that connecting elements between them are not necessary. A clamping clip (not shown) which is disposed around the proximal end 8 of the central mounting tube 7 ensures the fixing of the twist-grip shifter 1 on the handlebar. The clamping clip may also be disposed at other positions of the shifter, for example directly in the shifter housing 2 or on a fixed grip tube 17 of the fixed handgrip 13.

Figure 2:
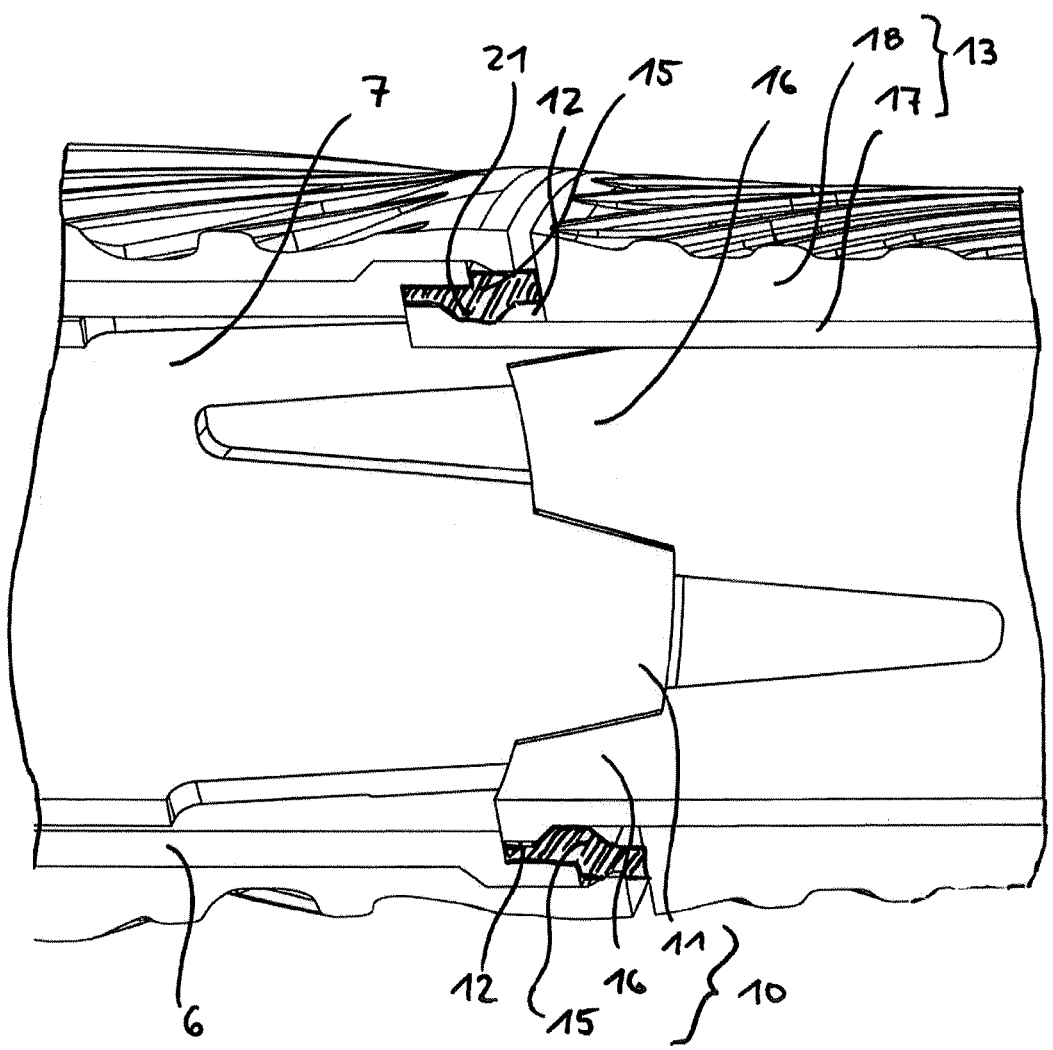
FIG. 2 is a cutaway view of the snap connection between the mounting tube and the fixed handgrip in the twist-grip shifter of FIG. 1.

The fixed handgrip 13 includes a radially internally disposed fixed grip tube 17 with a catch 16, which will be referred to as the second catch, and a radially externally located fixed rubber handgrip 18, as can be seen in FIG. 2. According to the invention, the connector 10 is located between the central mounting tube 7 and the fixed handgrip 13, as shown in FIG. 1.

The connector 10 comprises a first catch 11 on the distal end 9 of the central mounting tube 7, a catch ring 15, and the second catch 16 on the fixed handgrip 13, as shown in FIG. 1. The first catch 11 may have multiple portions in engagement with matching profiles on the catch ring 15, in order to fix this in the axial direction relative to the central mounting tube 7. In order that the first catches 11 can engage in the matching profiles on the catch ring 15 or disengage from the matching profiles, they are bent radially inwardly. If in the state where the twist-grip shifter is fitted onto the handlebar, the handlebar is located radially within the central mounting tube 7, and the first catch 11 cannot move radially inwards. Consequently, in the mounted state, the first catch 11 cannot disengage from the matching profile on the catch ring 15.

Figure 3:
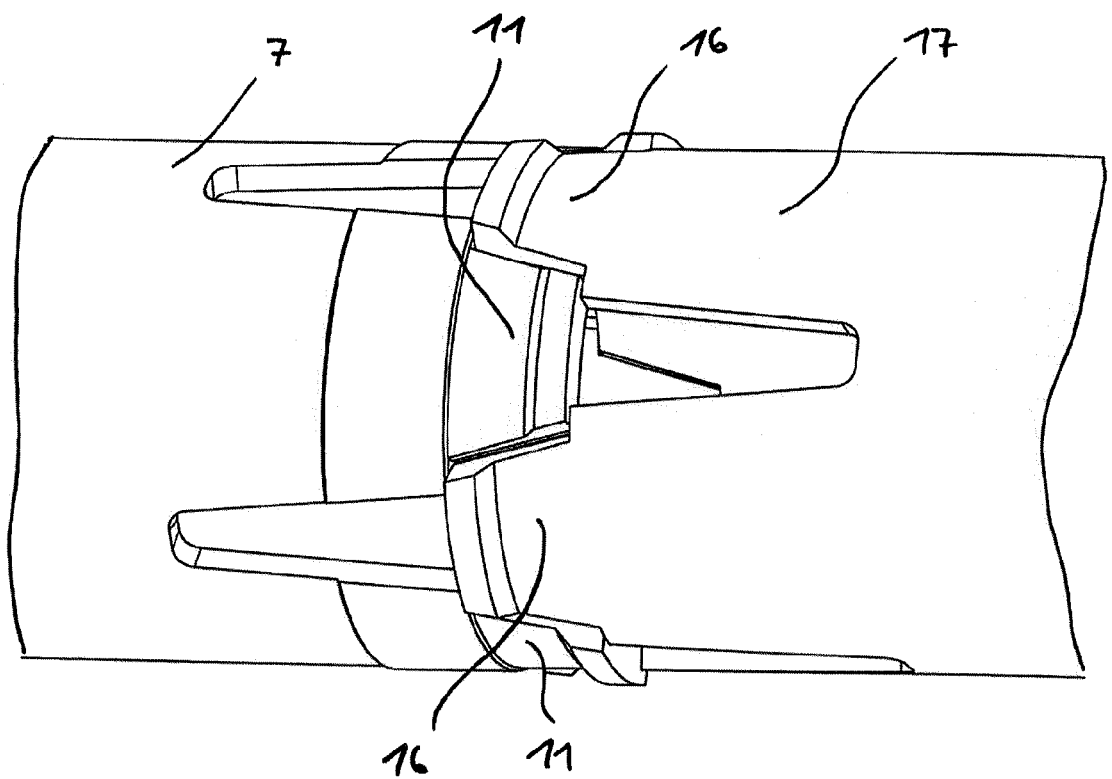
FIG. 3 is a perspective view of the catches in the snap connection of FIG. 2, without the components of the twist-grip shifter located radially outside these catches.

In the catch ring 15, the first catches 11 on the distal end 9 of the central mounting tube 7 and the second catches 16 on the fixed grip tube 17 bear against one another and are disposed to interleave in the circumferential direction, as shown in FIGS. 2 and 3. The catches 11, 16 extend through the central opening in the catch ring 15, wherein they engage with their ends in circumferential catch recesses 12 on the catch ring 15. For reasons of simple production and uncomplicated fitting, the catch recesses 12 are uninterrupted circumferentially. A catch ring 15 may be produced as a simple turned part made of metal, or formed from a molded plastic or a composite material, for example.

In another embodiment, the catch recesses 12 could also be interrupted, when the fixed handgrip 13 has a preferred angular position about the central axis 3. An equally circumferential catch protrusion 21, over which the first and second catches 11, 16 must move as they extend through the catch ring 15, is located on the inner periphery of the catch ring on the ends of the catch ring in the axial direction between the two catch recesses 12.

Alternatively, two catch protrusions could be disposed on the axial ends of the catch ring 15 between which a single catch recess is located. However, when manufacture takes place in a plastic injection moulding process this embodiment is more difficult to de-mold.

The catches 11, 16 have a general V shape in the axial direction, so that on the one hand a simple installation is possible, and on the other hand an almost play-free connection in relation to a reciprocal rotation in the circumferential direction is possible in the connector 10. The V shape is shown from the interior in FIG. 2 and from the exterior in FIG. 3. A plurality of slots, which extend in a direction parallel to the central axis 3, are provided in the circumferential direction between the first catches 11 and between the second catches 16. In this way, favourable spring characteristics are obtained. The elasticity of the catches 11, 16 is adjustable by means of the length of the slots.

Instead of the fixed handgrip 13 illustrated in FIG. 1, a closing ring, which constitutes a limit for the displacement movement of the rotatable handgrip part 6 in a direction parallel to the central axis 3 of the handlebar, can be disposed at the distal end 9 of the central mounting tube 7. Such a closing ring may offer a closed outer cylindrical surface on its external circumference as a mounting base for the rotatable handgrip part 6, on which the rotatable handgrip part 6 slides with an inner circumferential surface on an axial end.

In further alternative embodiments, the catch ring 15 between the central mounting tube 7 and the fixed grip tube 17 may be omitted. Then there is only one set of catches for the engagement in matching profiles on the counterpart tube. The catches can either be disposed on the central mounting tube 7 or on the fixed grip tube 17.

FIG. 4 shows the components of the positioning mechanism which are accommodated between the radially inner central mounting tube 7 and the radially outer shifter housing 2. The positioning mechanism has a positioning spring 22 which is disposed on the take-up spool 4 and also locks the take-up spool in the exact position when tensile forces act on the cable 5.

Figure 5:
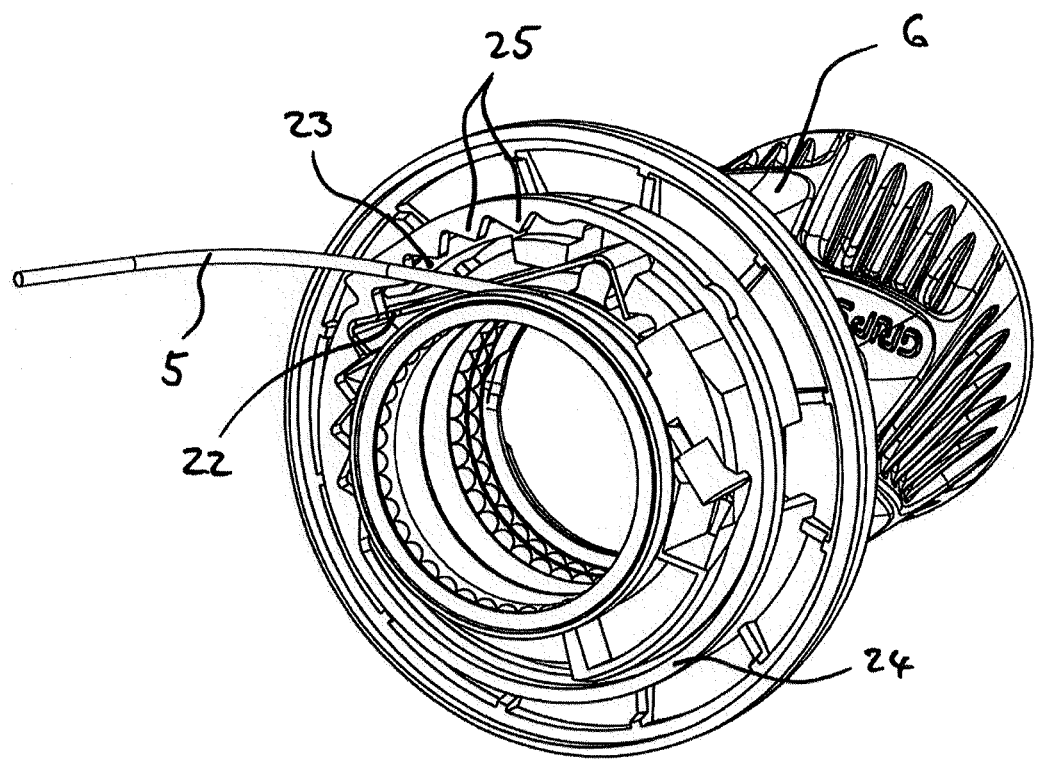
FIG. 5 is a perspective view of the components of the twist-grip shifter with the shifter housing removed from the side of the positioning mechanism.

FIG. 5 shows the components of the positioning mechanism with the shifter housing 2 removed. The end nipple of a cable 5 is inserted in the take-up spool 4, so that the cable together with the take-up spool is moved in a clockwise direction of rotation for pulling or is moved in a counter-clockwise direction of rotation for releasing of the cable 5. In the counter-clockwise direction, the cable 5 is acted on by a return spring (not shown) on the component to be shifted with a force, for example from a derailleur. In the same direction of rotation, a positioning spring 22, which engages a positioning tooth 25 of a positioning ring 24 and is mounted on the take-up spool 4, prevents a rotary movement of the take-up spool 4. There is a torsional backlash between the rotatable handgrip part 6 and the take-up spool 4. When the rotatable handgrip part 6 moves rotationally in the counter-clockwise direction, the disengaging finger 23 mounted on the rotatable handgrip part 6 moves towards the positioning spring 22 and disengages it from the positioning tooth 25. A spring (not shown), which acts in the circumferential direction between the rotatable handgrip part 6 and the take-up spool 4, gives the operator using the torsional backlash a resistance when shifting in the release direction until the intended disengagement of the positioning spring 22 from the positioning tooth 25 on the positioning ring 24 and the progressive release of the cable 5 are achieved.

The engagement of the positioning mechanism which is perceptible for the cyclist is reinforced by the fact that disruptive frictional forces are reduced to a minimum by the arrangement of ball bearings 26 between the take-up spool 4 and the central mounting tube 7. Bearing shells 27, for which sheet metal pressed parts which are cost-effective to produce can be used, are pressed in from both axial sides into the take-up spool 4. The balls of the ball bearings may roll directly on the central mounting tube 7. Since the tensile force on the cable 5 constitutes a transverse force on the take-up spool 4, the arrangement of the ball bearings 26 within the take-up spool has a particularly positive effect with regard to low friction.

The precise operation for positioning the take-up spool 4 is ensured by the use of a positioning ring 24, which may be made of a metallic material. Moreover, the metallic sound when the positioning spring 22 engages the positioning ring 24 reinforces the impression of precise operation.

The cable guide 19 is advantageously not disposed in a plane through the central axis 3 in order to avoid a collision with lever components by the brake lever mounted in the vicinity of the twist-grip shifter on the handlebar. The brake lever components extend generally in a region around a plane through the central axis 3.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims. Any modifications and variations of the device described and claimed herein are considered the invention; for example, those variations that combine separate parts are contemplated to fall within the scope of the invention. Thus, a wide variety of combinations and sub-combinations of parts, for example connecting parts, are contemplated to be alternative embodiments of the invention.

The invention claimed is:

1. A twist-grip shifter for actuation of bicycle gear units by pulling and releasing a cable, comprising:
   a shifter housing configured to be received on a handlebar,
   a central mounting tube including a proximal end and a distal end, wherein the proximal end of the central mounting tube is fixedly connected to the shifter housing,
   a rotatable handgrip rotatably disposed about the central mounting tube and adjacent the shifter housing,
   a take-up spool rotatable with the rotatable handgrip for pulling and releasing the cable,
   a fixed handgrip that is sized and shaped to be grasped by hand, the fixed handgrip including a fixed grip tube configured to be non-rotatably received on the handlebar and a resilient handgrip substantially covering the fixed grip tube, and
   a connector releasably connecting the distal end of the central mounting tube to the fixed grip tube.

2. The twist-grip shifter of claim 1, wherein the connector includes a first catch on the distal end of the central mounting tube, a second catch on the fixed grip tube, and a catch ring releasably connecting the first and second catches.

3. The twist-grip shifter of claim 2, wherein the central mounting tube and fixed grip tube are disposed about and directly adjoining the handlebar.

4. The twist-grip shifter of claim 2, wherein the catch ring has on an inner periphery thereof a circumferential catch protrusion which projects radially inwardly, the catch protrusion releasably connecting the first and second catches.

5. The twist-grip shifter of claim 4, wherein the central mounting tube and the fixed grip tube are connected when the first and second catches are bent radially inwardly and pushed axially over the catch protrusion.

6. The twist-grip shifter of claim 5, wherein the central mounting tube and fixed grip tube are disposed about and directly adjoining the handlebar.

7. The twist-grip shifter of claim 1, wherein the connector includes a first catch on the distal end of the central mounting tube and a second catch recess on the fixed grip tube, the second catch recess receiving the first catch.

8. The twist-grip shifter of claim 7, wherein the connector includes a second catch on the fixed grip tube and a first catch recess on the distal end of the central mounting tube, the first catch recess receiving the second catch.

9. The twist-grip shifter of claim 1, further including a bearing disposed between the central mounting tube and the take-up spool.

10. The twist-grip shifter of claim 1, wherein the shifter housing includes a metallic positioning ring and a positioning spring resiliently engaging the positioning ring.

11. The twist-grip shifter of claim 1, wherein the resilient handgrip is formed of rubber.

\* \* \* \* \*